US012640439B2

(12) United States Patent
Wang et al.

(10) Patent No.: US 12,640,439 B2
(45) Date of Patent: May 26, 2026

(54) BATTERY CORE AND BATTERY

(71) Applicant: BYD COMPANY LIMITED, Shenzhen (CN)

(72) Inventors: Xinyue Wang, Shenzhen (CN); Wansong Yuan, Shenzhen (CN); Dongjun Deng, Shenzhen (CN); Kefeng He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 692 days.

(21) Appl. No.: 18/084,055

(22) Filed: Dec. 19, 2022

(65) Prior Publication Data

US 2023/0118034 A1　Apr. 20, 2023

Related U.S. Application Data

(63) Continuation of application No. PCT/CN2021/103450, filed on Jun. 30, 2021.

(30) Foreign Application Priority Data

Jun. 30, 2020　(CN) ......................... 202010614979.7

(51) Int. Cl.
*H01M 50/474*　(2021.01)
*H01M 50/477*　(2021.01)
*H01M 50/483*　(2021.01)
*H01M 50/486*　(2021.01)

(52) U.S. Cl.
CPC ....... *H01M 50/474* (2021.01); *H01M 50/477* (2021.01); *H01M 50/483* (2021.01); *H01M 50/486* (2021.01)

(58) Field of Classification Search
CPC ............. H01M 50/474; H01M 50/477; H01M 50/483; H01M 50/486; H01M 4/02;

H01M 4/0404; H01M 50/586; H01M 50/59; H01M 50/595; H01M 50/531; H01M 50/593; H01M 10/0436; H01M 50/10; Y02E 60/10

See application file for complete search history.

(56) References Cited

U.S. PATENT DOCUMENTS 6,335,114 B1 * 1/2002 Ueshima ............. H01M 4/0416
429/162
2011/0171509 A1 * 7/2011 Nakagiri ............. H01M 50/451
429/94

FOREIGN PATENT DOCUMENTS

| CN | 102629678 A | 8/2012 |
| CN | 202695572 U | 1/2013 |
| CN | 106159179 A | 11/2016 |
| CN | 207977393 U | 10/2018 |
| CN | 208385519 U | 1/2019 |
| CN | 209981386 U | 1/2020 |

(Continued)

OTHER PUBLICATIONS

The World Intellectual Property Organization (WIPO) International Search Report for PCT/CN2021/103450 Sep. 13, 2021 7 pages (with translation).

*Primary Examiner* — Daniel S Gatewood
(74) *Attorney, Agent, or Firm* — Wenye Tan

(57) ABSTRACT

A battery core and a battery are provided. The battery core includes a plate, a separator, a tab, and an insulating support portion. The tab is connected with the plate. The insulating support portion is arranged on an end of the plate and supports the tab. The tab extends through the insulating support portion and extends outward.

16 Claims, 2 Drawing Sheets

(56)            References Cited

FOREIGN PATENT DOCUMENTS

| CN | 210535760 | U  |   | 5/2020  |
|----|-----------|----|---|---------|
| CN | 111326699 | A  |   | 6/2020  |
| JP | 2001093583 | A |   | 4/2001  |
| JP | 2005222901 | A |   | 8/2005  |
| JP | 2008021644 | A |   | 1/2008  |
| JP | 2017050102 | A | * | 3/2017  |
| WO | 2011145181 | A1 |  | 11/2011 |

* cited by examiner

BATTERY CORE AND BATTERY

CROSS-REFERENCE TO RELATED APPLICATIONS

The present application is a continuation application of PCT application No. PCT/CN2021/103450 filed on Jun. 30, 2021, which claims priority to Chinese Patent Application No. 202010614979.7, filed by BYD Co., Ltd. on Jun. 30, 2020, and entitled "BATTERY CORE AND BATTERY". The entire content of all of the above-referenced applications is incorporated herein by reference.

FIELD

The present disclosure relates to the field of batteries, and more specifically, to a battery core and a battery having the same.

BACKGROUND

In related arts, a battery core of a battery has a plate, a separator, and a tab. During connection of the tab to an end cover of the battery and after the tab is connected with the end cover of the battery and the battery is formed, the tab is bent by different degrees. During the bending, the tab is tilted so that a tab root pushes against the separator, and a positive plate, the separator, and a negative plate come into close contact. During the use of the battery, the squeezed separator may be damaged, resulting in an insulation failure of the separator. Therefore, the positive plate and the negative plate come into contact, which results in a short circuit inside the battery core, thereby reducing the use safety of the battery.

SUMMARY

The present disclosure aims to resolve at least one of the technical problems existing in the related art. The present disclosure is intended to provide a battery core. An insulating support portion of the battery core supports a tab, which can reduce the risk of damaging the separator as a result of pressing by the tab, thereby reducing the risk of a short circuit inside the battery core. In this way, the use safety of the battery can be improved.

The battery core of the present disclosure includes: a plate, a separator, and a tab, where the tab is connected with the plate; and an insulating support portion. The insulating support portion is arranged on an end of the plate and supports the tab. The tab extends through the insulating support portion and extends outward.

The present disclosure further provides a battery. The battery of the present disclosure includes the above battery core.

Additional aspects and advantages of the present disclosure are partially provided in the following description, and partially become apparent in the following description or understood through the practice of the present disclosure.

DETAILED DESCRIPTION

Figure 1:
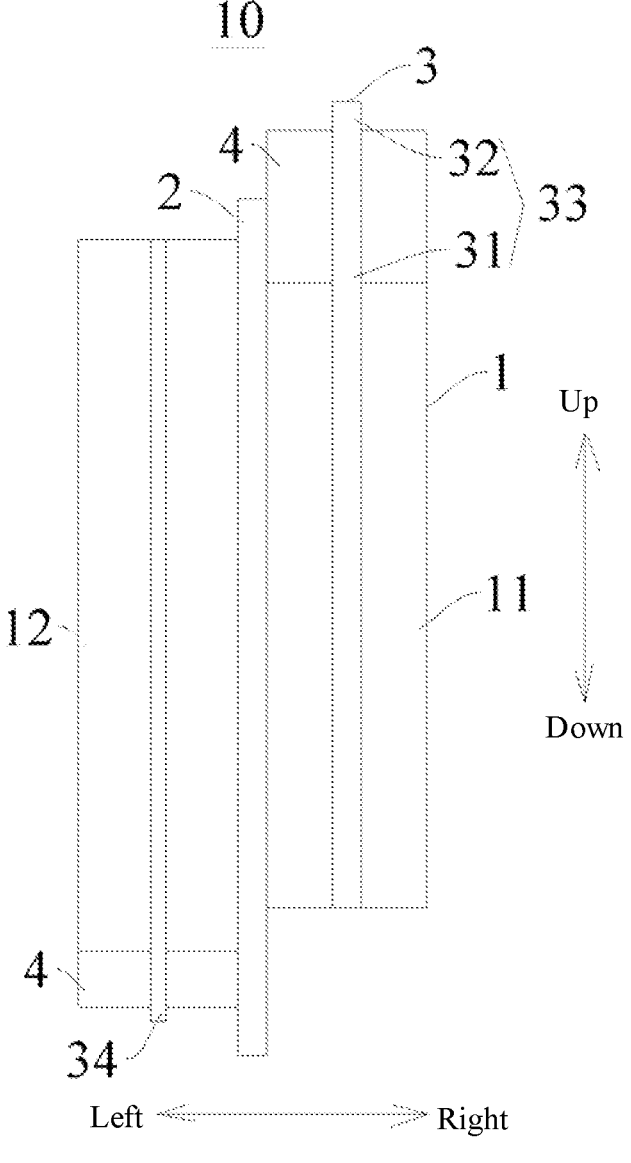
FIG. 1 is a cross-sectional view of a battery core according to an embodiment of the present disclosure.

Embodiments of the present disclosure are described in detail below, together with the accompanying drawings, where the same or similar elements or the elements having same or similar functions are denoted by the same or similar reference numerals throughout the description. The embodiments described below with reference to the accompanying drawings are illustrative and used only for explaining the present disclosure, and should not be construed as a limitation on the present disclosure.

A battery core 10 in an embodiment of the present disclosure is described below with reference to FIG. 1 and FIG. 2. The battery core 10 may be arranged in a battery.

Figure 2:
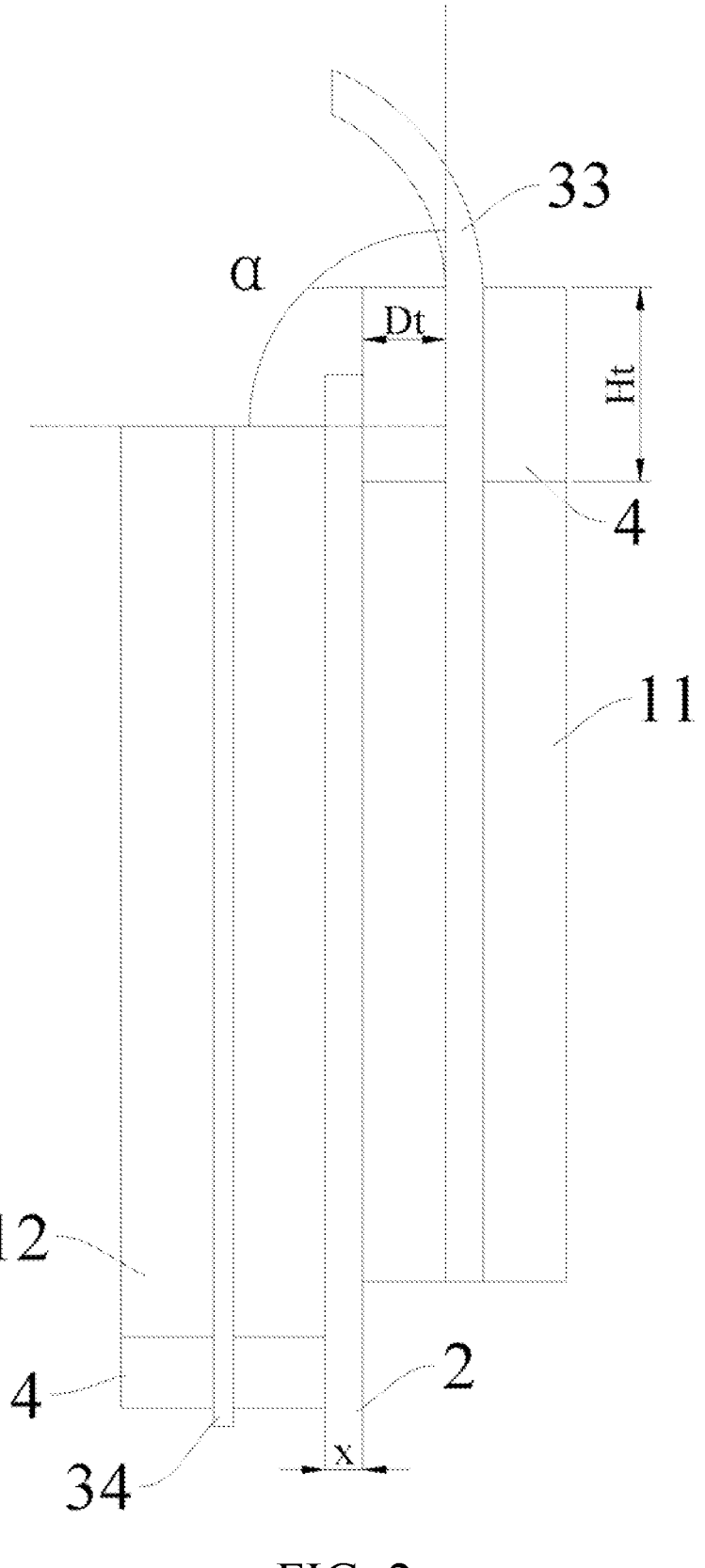
FIG. 2 is a schematic diagram of tilting of a tab of a battery core according to an embodiment of the present disclosure.

As shown in FIG. 1 and FIG. 2, the battery core 10 of the present disclosure includes a plate 1, a separator 2, an insulating support portion 4, and a tab 3. The tab 3 is connected with the plate 1. It should be noted that the plate 1 includes a positive plate 11 and a negative plate 12, and the tab 3 includes a positive tab 33 and a negative tab 34. The positive tab 33 is connected with the positive plate 11, and the negative tab 34 is connected with the negative plate 12. The insulating support portion 4 is arranged on end of the plate 1 and supports the tab 3, and the tab 3 extends through the insulating support portion 4 and extends outward. The insulating support portion 4 is arranged on an end of the plate 1 connected with the tab 3. That is to say, the insulating support portion 4 is arranged on an end of the plate 1 through which the tab 3 is led out. It should be noted that the insulating support portion 4 may be arranged on both an end of the positive plate 11 and an end of the negative plate 12, and the positive tab 33 and the negative tab 34 both may extend through the insulating support portion 4 and extend outward.

As shown in FIG. 1, the insulating support portion 4 is arranged on an upper end of the positive plate 11 and a lower end of the negative plate 12, an upper end of the positive tab 33 extends through the insulating support portion 4 and extends upward, and a lower end of the negative tab 34 extends through the insulating support portion 4 and extends downward. Specifically, during connection of the positive tab 33 or the negative tab 34 to an end cover of the battery, for example, during connection of the positive tab 33 to the end cover of the battery, the insulating support portion 4 can support the tab 3 when the tab 3 is bent. In addition, after the tab 3 is connected to the end cover and the battery is formed, the insulating support portion 4 supports the tab 3. Compared with the related art, the tab 3 is not seriously tilted, and the tab 3 does not excessively squeeze the separator 2. Therefore, when the battery core 10 is vibrated or squeezed, the risk of damaging the separator 2 can be reduced, and the positive plate 11 and the negative plate 12 are prevented from directly contacting each other. In this way, the risk of a short circuit inside the battery core 10 can be reduced, thereby improving the use safety of the battery. FIG. 1 shows a situation in which the positive tab 33 and the negative tab 34 are led out through different sides. That is to say, the positive tab 33 is led out upward, and the negative tab 34 is led out downward. It may be understood that the positive tab 33 and the negative tab 34 may be led out through a same side. That is to say, the positive tab 33 and the negative tab 34 are both led out upward or led out downward. Regardless of how the positive tab 33 and the negative tab 34 are led out, the insulating support portion 4 is arranged on the end of the plate 1 through which the tab 3 is led out.

The insulating support portion 4 is arranged to support the tab 3 during connection of the tab 3 to the end cover of the battery. Therefore, the tab 3 is not seriously tilted, and the tab 3 does not squeeze the separator 2, which can reduce the risk of damaging the separator 2 and reduce the risk of a short circuit inside the battery core 10. In this way, the use safety of the battery can be improved.

In some embodiments of the present disclosure, as shown in FIG. 1, the tab 3 may include a tab root 31 and a tab head 32. The tab root 31 is connected with the end of the plate 1, the tab head 32 is away from the end of the plate 1. The insulating support portion 4 supports the tab root 31. The positive tab 33 and the negative tab 34 each may include the tab root 31 and the tab head 32. The positive tab 33 is used as an example for illustration. As shown in FIG. 1, the tab root 31 is arranged below the tab head 32, the tab root 31 is connected with the tab head 32, and the tab root 31 is connected with the upper end of the positive plate 11. During connection of the positive tab 33 to the end cover of the battery, the insulating support portion 4 supports the tab root 31, which can prevent the positive tab 33 from being seriously tilted, and can realize a proper bending angle of the positive tab 33, so that the positive tab 33 can be prevented from excessively squeezing the separator 2, the separator 2 can be effectively prevented from being damaged, and the positive plate 11 and the negative plate 12 can be further prevented from directly contacting each other, thereby further improving the use safety of the battery.

In some embodiments of the present disclosure, as shown in FIG. 1, a cross section of the insulating support portion 4 is rectangular. The rectangular insulating support portion 4 can be easily coated and formed during production. It may be understood that the cross-sectional shape of the insulating support portion 4 is not limited to the rectangle, and may be other shapes such as a trapezoid. A thickness of the insulating support portion 4 is equal to a thickness of the plate 1. It should be noted that, at the positive plate 11, in a left-right direction in FIG. 1, the thickness of the insulating support portion 4 is a distance between a left side surface and a right side surface of the insulating support portion 4, and a value of the distance between the left side surface and the right side surface of the insulating support portion 4 is equal to a value of a distance between a left side surface and a right side surface of the positive plate 11. In an up-down direction in FIG. 1, the left side surface of the insulating support portion 4 and the left side surface of the positive plate 11 are in a same plane, and the right side surface of the insulating support portion 4 and the right side surface of the positive plate 11 are in a same plane. Likewise, at the negative plate 12, in the left-right direction in FIG. 1, the thickness of the insulating support portion 4 is a distance between a left side surface and a right side surface of the insulating support portion 4, and a value of the distance between the left side surface and the right side surface of the insulating support portion 4 is equal to a value of a distance between a left side surface and a right side surface of the negative plate 12. In an up-down direction in FIG. 1, the left side surface of the insulating support portion 4 and the left side surface of the negative plate 12 are in a same plane, and the right side surface of the insulating support portion 4 and the right side surface of the negative plate 12 are in a same plane. In this way, the insulating support portion 4 can support the positive tab 33 and the negative tab 34 more effectively, and can ensure more proper bending angles of the positive tab 33 and the negative tab 34, so that the positive tab 33 and the negative tab 34 can be more effectively prevented from squashing the separator 2, and the contact between the positive tab 33 and the negative plate 12 and between the negative tab 34 and the positive plate 11 can be further prevented, thereby further reducing the risk of a short circuit of the battery core 10.

In some embodiments of the present disclosure, as shown in FIG. 1, the insulating support portion 4 is arranged on an end of the positive plate 11, and a free end surface of the insulating support portion 4 exceeds an end surface on a same side of the separator 2. The insulating support portion 4 is arranged on the upper end of the positive plate 11, and an upper end surface of the insulating support portion 4 exceeds an upper end surface of the separator 2. In this way, when the positive tab 33 is bent, the positive tab 33 can be separated from the separator 2, so that the positive tab 33 can be prevented from squeezing the separator 2, and the separator 2 can be further prevented from being damaged, thereby ensuring the insulation performance of the separator 2.

In some embodiments of the present disclosure, as shown in FIG. 1, a height Ht of the insulating support portion 4 configured to support the tab 3 (that is, the positive tab 33) connected with the positive plate 11, a thickness Dt of the insulating support portion 4, a bending angle $\alpha$ of the tab 3, and a thickness x of the separator 2 satisfy: $Ht \geq (100 \ \mu m + x - Dt)/\cos \alpha$. A height direction of the insulating support portion 4 is the up-down direction in FIG. 1, and a thickness direction of the insulating support portion 4 is the left-right direction in FIG. 1. The thickness x of the separator 2 can satisfy: $4 \ \mu m \leq x \leq 40 \ \mu m$. In this way, after the positive tab 33 is bent, a proper bending angle of the positive tab 33 can be realized, so that the tab 3 can be further prevented from squeezing the separator 2, the risk of damaging the separator 2 can be further reduced when the battery core 10 is vibrated or squeezed, and the positive plate 11 and the negative plate 12 can be further prevented from directly contacting each other. Therefore, the risk of a short circuit inside the battery core 10 can be further reduced, thereby improving the use safety of the battery.

In some embodiments of the present disclosure, Ht, Dt, and x further satisfy: $10 \ mm \geq Ht \geq 2 \ (100 \ \mu m + x - Dt)$. In this way, a proper bending angle of the positive tab 33 can be realized, so that the electrode tab 3 can be further prevented from squeezing the separator 2, the risk of damaging the separator 2 can be further reduced, and the positive plate 11 and the negative plate 12 can be effectively prevented from directly contacting each other. Therefore, the risk of a short circuit inside the battery core 10 can be further reduced, thereby effectively improving the use safety of the battery. The height relation design for the insulating support portion 4 can not only realize support for the tab, but also ensure the arrangement of the insulating support portion at the tab root to avoid a short circuit, thereby realizing more effective insulation.

In some embodiments of the present disclosure, as shown in FIG. 1, a height Ht of the insulating support portion 4 configured to support the tab 3 (the negative tab 34) connected with the negative plate 12 satisfies: $1 \ mm \leq Ht \leq 10 \ mm$. A height direction of the insulating support portion 4 is the up-down direction in FIG. 1. In this way, the structural strength of the end of the negative plate 12 can be ensured, so that the positive plate 11 and the negative plate 12 can be prevented from tilting when the tab 3 is bent. Therefore, the state of the tab 3 upon lead-out can be ensured, and the wear of the separator 2 can be avoided, thereby ensuring the insulation between the positive plate 11 and the negative plate 12.

In an embodiment of the present disclosure, as shown in FIG. 1, a thickness Dt of the insulating support portion 4 satisfies: $4 \ \mu m \leq Dt \leq 100 \ \mu m$. The thickness design for the insulating support portion 4 can realize effective support the tab 3 and prevent a short circuit as a result of tilting and squeezing of the tab.

In some embodiments of the present disclosure, the insulating support portion 4 is attached face-to-face to an end surface of the plate 1. It should be noted that, as shown in FIG. 1, the insulating support portion 4 is attached face-to-face to the upper end of the positive plate 11, and the insulating support portion 4 is attached face-to-face to the lower end of the negative plate 12. In this way, the insulating support portion 4 can be reliably mounted to the end of the plate 1, the insulating support portion 4 can stably support the electrode tab 3, and the insulating support portion 4 can be arranged more properly.

In some embodiments of the present disclosure, the insulating support portion 4 may be configured as an inorganic salt support portion or a heat-resistant polymer support portion. When the insulating support portion 4 is configured as the inorganic salt support portion, the insulating support portion 4 may be configured as aluminum oxide, aluminum hydroxide, silicon oxide, silicon hydroxide, magnesium oxide, or magnesium hydroxide. The insulating support portion 4 may alternatively be configured as salts of nitrogen, sulfur, or phosphorus. When the insulating support portion 4 is configured as the heat-resistant polymer support portion, the insulating support portion 4 may be configured as aramid extremely heat-resistant polymer materials such as a polyimide film (PI), polyethylene terephthalate (PET, which is a thermoplastic polyester), or polybutylene terephthalate (PBT). In this way, thermal deformation of the insulating support portion 4 can be prevented, and the structural strength of the insulating support portion 4 can be ensured, so that the insulating support portion 4 can reliably support the tab 3, thereby ensuring the operating reliability of the battery core 10.

The battery in this embodiment of the present disclosure includes the battery core 10 in the above embodiment, and the battery core 10 is arranged in the battery. The insulating support portion 4 supports the tab 3 during connection of the tab 3 to an end cover of the battery. Therefore, the tab 3 is not seriously tilted, and the tab 3 does not squeeze the separator 2, which can reduce the risk of damaging the separator 2 and reduce the risk of a short circuit inside the battery core 10. In this way, the use safety of the battery can be improved.

In the descriptions of the present disclosure, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In the present disclosure, schematic descriptions of the foregoing terms do not necessarily point at a same embodiment or example. In addition, the described specific features, structures, materials, or characteristics may be combined in a proper manner in any one or more of the embodiments or examples.

Although certain embodiments of the present disclosure are shown and described, a person of ordinary skill in the art may understand that various changes, modifications, replacements and variations may be made to the embodiments without departing from the principles and spirit of the present disclosure, and the scope of the present disclosure is as defined by the appended claims and their equivalents.

What is claimed is:

1. A battery core, comprising:

a plate, a separator, and a tab, wherein the tab is connected with the plate; and an insulating support portion, arranged on an end of the plate and supporting the tab, wherein the tab extends through the insulating support portion and extends outward, wherein the plate comprises a positive plate; the insulating support portion is arranged on an end of the positive plate; and a free end surface of the insulating support portion exceeds an end surface on a same side of the separator, wherein an upper end surface of the insulating support portion exceeds an upper end surface of the separator such that, when the tab is bent, the tab is separated from the separator and prevented from squeezing the separator, and wherein a height Ht of the insulating support portion configured to support the tab connected with the positive plate, a thickness Dt of the insulating support portion between the separator and the tab connected with the positive plate, a bending angle $\alpha$ of the tab, and a thickness x of the separator satisfy: $Ht \geq (100 \ \mu m + x - Dt)/\cos \alpha$, wherein Dt and x are non-zero numbers, and $0 < \alpha < 90°$.

2. The battery core according to claim 1, wherein the tab comprises a tab root and a tab head; the tab root is connected with the end of the plate; the tab head is away from the end of the plate; and the insulating support portion supports the tab root.

3. The battery core according to claim 1, wherein a thickness of the insulating support portion is equal to a thickness of the plate.

4. The battery core according to claim 1, wherein the tab comprises a positive tab connected with the positive plate; and the positive plate extends through the insulating support portion and extends outward.

5. The battery core according to claim 4, wherein the plate further comprises a negative plate; the tab further comprises a negative tab connected with the negative plate; the insulating support portion is arranged on an end of the negative plate; and the negative plate extends through the insulating support portion and extends outward.

6. The battery core according to claim 5, wherein the positive tab and the negative tab are led out through different sides of the battery core.

7. The battery core according to claim 1, wherein the Ht, Dt, and x satisfy:

$$10 \ mm \geq Ht \geq 2(100 \ \mu m + x - Dt).$$

8. The battery core according to claim 1, wherein the plate comprises a negative plate; and the height Ht of the insulating support portion configured to support the tab connected with the negative plate ranges from about 1 mm to about 10 mm.

9. The battery core according to claim 1, wherein the insulating support portion is attached face-to-face to the end of the plate.

10. The battery core according to claim 1, wherein the thickness Dt of the insulating support portion between the separator and the tab ranges from about 4 $\mu m$ to about 100 $\mu m$.

11. The battery core according to claim 1, wherein the thickness x of the separator ranges from about 4 $\mu m$ to about 40 $\mu m$.

12. The battery core according to claim 1, wherein the insulating support portion is configured as an inorganic salt support portion.

13. The battery core according to claim 1, wherein the insulating support portion is configured as a heat-resistant polymer support portion.

14. The battery core according to claim 13, wherein the heat-resistant polymer support portion is made of a polyimide (PI) film, a thermoplastic polyester, or polybutylene terephthalate (PBT).

15. The battery core according to claim 1, wherein a cross section of the insulating support portion is rectangular.

16. A battery, comprising:

a battery core, wherein the batter core comprises:

a plate, a separator, and a tab, wherein the tab is connected with the plate; and an insulating support portion, arranged on an end of the plate and supporting the tab, wherein the tab extends through the insulating support portion and extends outward, wherein the plate comprises a positive plate; the insulating support portion is arranged on an end of the positive plate; and a free end surface of the insulating support portion exceeds an end surface on a same side of the separator, wherein an upper end surface of the insulating support portion exceeds an upper end surface of the separator such that, when the tab is bent, the tab is separated from the separator and prevented from squeezing the separator, and wherein a height Ht of the insulating support portion configured to support the tab connected with the positive plate, a thickness Dt of the insulating support portion between the separator and the tab connected with the positive plate, a bending angle $\alpha$ of the tab, and a thickness x of the separator satisfy: Ht$\geq$(100 $\mu$m+x−Dt)/cos $\alpha$, wherein Dt and x are non-zero numbers, and 0<$\alpha$<90°.

\* \* \* \* \*